United States Patent
Ota

(10) Patent No.: US 8,580,008 B2
(45) Date of Patent: Nov. 12, 2013

(54) VERTICAL FILTERING AND SEPARATING SUCTION MACHINE OF CHIPS, STEAM AND SMOKE BY CHANGE OF AIR DIRECTION, FOR MACHINING CENTER, LATHE MACHINE OR OTHER MACHINES GENERATING STEAM FROM OIL OR COOLANT

(76) Inventor: Tomio Ota, Grand Bourg (AR)

( * ) Notice: Subject to any disclaimer, the term of this patent is extended or adjusted under 35 U.S.C. 154(b) by 46 days.

(21) Appl. No.: 13/289,174

(22) Filed: Nov. 4, 2011

(65) Prior Publication Data

US 2012/0111168 A1 May 10, 2012

(30) Foreign Application Priority Data

Nov. 5, 2010 (AR) .............................. P20100104101

(51) Int. Cl.
*B01D 45/00* (2006.01)
(52) U.S. Cl.
USPC .................... 55/440; 55/452; 55/441; 55/442; 55/443; 55/444; 55/498; 55/459.3; 55/447; 55/465; 55/337; 55/427; 55/426; 55/DIG. 34; 96/417; 96/418; 96/419; 96/420; 96/421; 96/422; 96/423; 96/424; 340/607; 116/DIG. 25
(58) Field of Classification Search
USPC .......... 55/440, 452, 441, 442, 443, 444, 498, 55/459.3, 447, 465, 337, 427, 426, 55/DIG. 34; 96/417–422, 424; 340/607; 116/DIG. 25
See application file for complete search history.

(56) References Cited

U.S. PATENT DOCUMENTS

| 919,249 | A | * | 4/1909 | Ruddiman ...................... 96/349 |
| 1,906,663 | A | * | 5/1933 | Taylor et al. .................... 55/441 |
| 2,118,167 | A | | 5/1938 | Connor |
| 2,128,166 | A | | 8/1938 | Schmidt |
| 2,296,359 | A | | 9/1942 | Martinet |
| 2,360,981 | A | * | 10/1944 | Rupp ............................. 96/349 |
| 2,394,923 | A | | 2/1946 | Little |
| 2,413,499 | A | | 12/1946 | Hulton |
| 2,441,631 | A | | 5/1948 | Hills |
| 2,562,996 | A | | 8/1951 | Winthrop |
| 2,597,690 | A | | 5/1952 | Wied |
| 2,753,954 | A | * | 7/1956 | Townsend ....................... 55/441 |
| 2,943,698 | A | | 7/1960 | Bishop |
| 3,308,609 | A | | 3/1967 | McCulloch et al. |
| 3,648,442 | A | | 3/1972 | Bourne |
| 4,221,081 | A | | 9/1980 | Everett |
| 4,388,086 | A | * | 6/1983 | Bauer et al. ..................... 95/118 |
| 4,645,521 | A | * | 2/1987 | Freesh ............................ 55/309 |
| 4,718,924 | A | | 1/1988 | DeMarco |

(Continued)

FOREIGN PATENT DOCUMENTS

| EP | 1726245 | 11/2006 |
| EP | 1952743 | 8/2008 |

*Primary Examiner* — Robert Clemente
*Assistant Examiner* — Minh-Chau Pham
(74) *Attorney, Agent, or Firm* — Neifeld IP Law, PC

(57) ABSTRACT

The invention hereby disclosed is a vertical filtering and separating suction machine of chips, steam and smoke for machining center, lathe machine or other machines, which operates by sudden changes of sucked air, thus generating hits which separate heavy particles, whose suction pipe extends almost up to the bottom of the rotor, which only uses filters at the end of the process of air purification, whose rotor has outer paddles modified in order to improve suction power and to cause more hits of air flow, and which includes an air pressure alarm showing the filter is saturated.

11 Claims, 4 Drawing Sheets

(56) References Cited

U.S. PATENT DOCUMENTS

Figure 1:
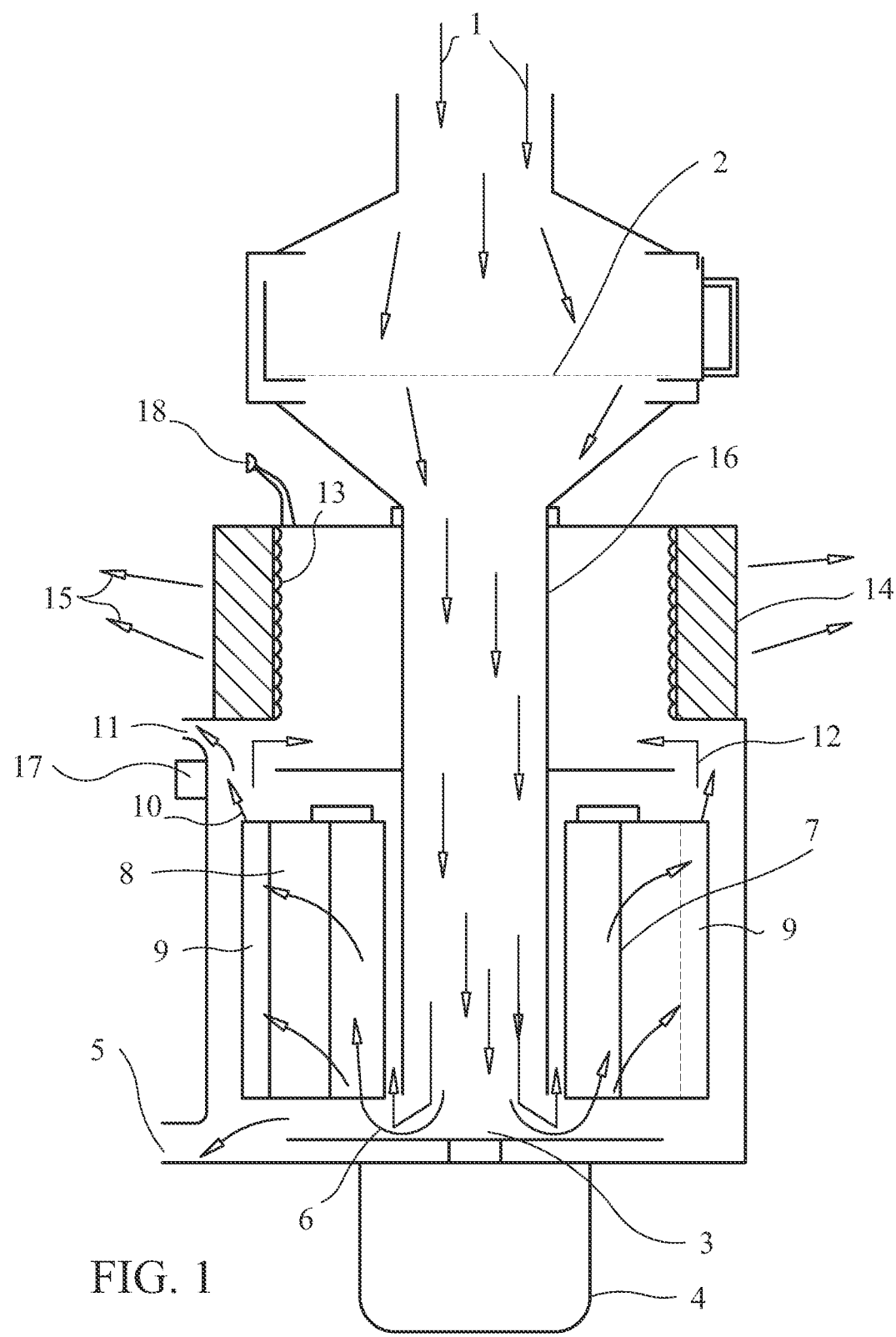

| | | |
|---|---|---|
| 4,759,781 A | 7/1988 | Olson |
| 4,869,737 A | 9/1989 | Parenti |
| 4,971,518 A | 11/1990 | Florin |
| 5,223,005 A | 6/1993 | Avondoglio |
| 5,271,751 A | 12/1993 | Lugler |
| 5,560,075 A | 10/1996 | Jankowski |
| 6,484,350 B2 | 11/2002 | Yung |
| 6,485,536 B1 | 11/2002 | Masters |
| 6,829,804 B2 | 12/2004 | Sepke |
| 6,840,972 B1 | 1/2005 | Kim |
| 7,247,181 B2 | 7/2007 | Hansen et al. |
| 7,261,762 B2 * | 8/2007 | Kang et al. ............... 95/1 |
| 8,083,824 B2 * | 12/2011 | Fujiyama et al. ........... 55/440 |
| 8,119,000 B2 * | 2/2012 | Oserod ................ 210/221.2 |
| 2004/0194250 A1 | 10/2004 | Conrad et al. |
| 2006/0230715 A1 | 10/2006 | Oh et al. |

* cited by examiner

VERTICAL FILTERING AND SEPARATING SUCTION MACHINE OF CHIPS, STEAM AND SMOKE BY CHANGE OF AIR DIRECTION, FOR MACHINING CENTER, LATHE MACHINE OR OTHER MACHINES GENERATING STEAM FROM OIL OR COOLANT

CROSS REFERENCE TO RELATED APPLICATIONS

This application claims priority to AR P2010 0104101, filed Nov. 5, 2010. The application, AR P2010 0104101, is incorporated by reference, in its entirety.

The present invention consists of a vertical filtering and separating suction machine of chips, steam and smoke, which operates primarily by sudden changes of direction in the air flows, specially adapted for machining centers, lathes and machines of the kind that while operating, produces light chips, oil steam or coolant steam, such as cutting machines, grinders, antirust applicators, which in order to prevent these pollutants from spreading throughout the plant environment, sucks and purifies the air inside the machine.

Protection is given to a filtering and separating suction machine, of the kind that separates heavy elements by violent changes of direction of the air inside, by taking advantage of the different specific gravity of air in relation to its pollutants, and using vertical suction to increase the flow speed and improve efficiency in the separation process, with a lower energy expenditure, generating several flow hits, avoiding the use of primary filters in the air inlet circuit, with a system of propellers and centrifugal paddles, which reduces the "crossflow" effect, and with flow passing through a double synthetic and cellulose filter prior to the air outlet.

In order to understand the present invention so that it can be easily put into practice, in the following paragraphs there is a precise description of the preferred way of making, with references to the illustrative drawings attached hereto, as a purely demonstrative example of the invention but not limited to it, whose components shall be selected among various equivalents without departing from the principles of the invention set forth in this documentation.

PRIOR ART

This invention comes within the scope of industrial suction and filtering machines, specially adapted to collect, separate and filter pollutants resulting from the use of machinery which, as a result of their operation, generate mist either from steam, oil or coolant or light chips and return clean air to the plant.

Machines known as "Machining center", are real robots which, by the use of an automatic arm and following specific guidelines contained in the software, use different tools adapted to the mechanical arm, among a large number they have, and with them they mould a piece of metal until it is given the intended shape.

Upon turning of metal parts, a large amount of small volatile chips are generated, as well as a spray of soluble oils.

At the same time, in order to avoid heating produced by friction, the machine uses coolant that is spilt over the surfaces in contact, which generates steam or mist that remains suspended inside the machine.

If these elements remain suspended inside the machines, they will penetrate into their electrical cabinets, landing on their components, plates and electrical circuits, damaging the electrical systems.

On the other hand, when an operator had to open the machine cabinet to remove the machined piece, gases and suspended elements would be released, thus hitting squarely in the face of the operator, and then they would spread through the air of the factory, causing its pollution.

The same happens with machines known as "Lathes", which operate similarly to the one described before, except that the arm holding the tools is kept fix and instead pieces are moved to be turned. Many other cutting machines, grinders, gear machines, antirust applicators, among others, also generate similar steam and mist.

These are all cases of fumes with a high degree of toxicity for the human being, which are also harmful to the own operation of the machines.

In order to avoid this type of pollution, different kind of suction machines are being used, which are connected to the inside of the cabinet of the cutting or turning machine by a pipe, and exhaust air, thus collecting these particles and fumes to later restore clean air inside the plant, through a filtering system.

These machines usually have filters in the air inlet area, in order to reduce, from the beginning, the income of the heaviest particles inside the suction machine and minimize the chances that the rotor gets unbalanced.

The air inlet pipe reaches the inside of a rotor, releasing the polluted air within it so that the process of particles separation may take place.

This rotor rotates fast enough (between 2800 and 3500 revolutions per minute) so that, by effect of centrifugal force, those particles that passed the first filter become detached, being kept inside the rotor.

The common rotor has rectangular paddles attached perpendicularly both to the inside of the cylindrical container cabinet (usually four), and to the outside, to generate, as a result of its centrifugal rotation, a flow of air entering into the rotor.

The cylindrical rotor additionally has eight equivalent openings so that the absorbed air may go out through them towards the area between the rotor and the device casing.

In turn, the casing has a slot or opening in its outer wall, which serves as an air outlet, through which the air is directed to a new filter before emerging outside.

Suction machines most commonly used for this purpose are horizontal-flow, that is, the air goes through them perpendicularly to the direction of the terrestrial gravitational force.

OBJECT

Suction machines described before have many technical problems which the invention disclosed intends to overcome and they are as follows:

1) Filters placed in the air suction area, whose function is to limit the access of air polluted with heavy particles directly into the rotor and thus prevent it from getting unbalanced, however reduce the power of the air flow and demand a greater expenditure of energy to keep it circulating at centrifuge speed, and therefore very powerful motors must be used.

(2) On the other hand, that first filter receives air directly from the inside of the machine, with a high degree of pollutants, which makes it saturate very quickly and must be changed very often. This process forces to stop the machine operation and to have spare parts permanently. Or, as frequently occurs, the filter is used beyond its filtering threshold, generating a greater demand on the suction machine in later filtering stages and probable failures.

(3) The fast degradation of filters also causes vibrations resulting from the poor air circulation which end up damaging the machine.

(4) In these devices, the second particles separation, carried out inside the rotor, while generating the outlet of clean air through a duct for that purpose, also makes these particles (microdrops, etc.) remain inside the suction machine. The accumulation of these drops and corpuscles in the long run ends up damaging the rotor operation. This generates the need for maintenance to clean waste, with the loss of time involved, and also reduces the operating lifetime of the rotor.

(5) In these devices, the main air flow entering the rotor moves from its center, where a negative air pressure is generated, through the rectangular slots in the rotating inner cylinder, towards the space left between the inner cylinder and the outlet one (or casing), where air pressure is positive, and then evacuates the air through the air outlet duct located in the casing.

This internal recirculation of air gives rise to a phenomenon known as "cross flow" or crossed flows of air, which significantly reduce suction performance and undermine the proper addressing of air towards the filtering areas.

(6) Due to their shape and tilt, the outer paddles of the rotor are not ideal for generating the highest possible speed, and as they are misused aerodynamically, they require a greater power from the motor in order to reach centrifuge speed.

(7) The horizontal air flow, in addition, misuses the gravitational force as an accelerator of flows, demanding greater energy expenditure so that the air may pass through the filtering systems.

(8) These suction machines do not have alarm systems for alerting in case filters get dirty beyond their filtering threshold.

The suction machine herein disclosed proposes ingenious technical solutions for each one of these issues:

As described below, the proposal covers the elimination of the filter in the suction inlet, which is replaced by a thick wire mesh that will only filter really big particles.

The proposal consists of a system of vertical aft flow which takes advantage of the acceleration of gravitational force in order to drive the pollutant inside the suction machine harder and evacuate it later.

It is also proposed to incorporate a pipe or air suction duct that extends almost to the bottom of the rotor, in order to maintain the impulse of the initial air column and make it hit the bottom, generating a change in direction of 180° which separates most of impurities in a single time.

It is further proposed to incorporate holes at the bottom of the rotor so that drops and particles that are separated after the hit, may drain down and through a drainage pipe, may reach a receiving container placed under the suction machine and do not remain trapped in the rotor.

It is also proposed that the outer paddles of the rotor are tilted about five degrees from its vertical axis, as well as the slots in the rotor cylinder, giving rise to some parallelograms which, when rotating, drive the air more strongly.

It is proposed that these paddles present a fold along the line of the outer side of the parallelogram of about 130 degrees, in the direction of the rotor rotation, forming a sort of gutter which causes a further change in the direction of air flow, catching more waste there.

It is also proposed to incorporate some smaller horizontal paddles at the top of the ring surrounding the "mouth" of the rotor, in order to minimize the "cross-flow" effect and direct the air towards the filtering area.

It is proposed to incorporate in addition an audible alarm system to alert when filters get dirty beyond a certain level that may affect the proper functioning of the equipment.

This suction machine as designed before allows its suction flow to remain powerful even with the use of a less-power motor and requires no maintenance.

DESCRIPTION OF THE INVENTION

The vertical filtering and separating suction machine of chips, steam and smoke by change of air direction, for machining center, lathe machine or other machines generating steam from oil or coolant that is disclosed in this presentation, consists of the following parts, pieces or sections:

A pipe, preferably made of rigid plastic which serves as an air collector and which is connected to the sector of the machining center (or another cutting machine) where mist to be sucked is generated, about 110 mm. in diameter, and whose length and route will be modified according to the features of workplace, the place where the suction machine will be located and other variables.

A parallelepiped-shaped cabin, about 25 cm.×26 cm×11 cm. high, preferably made of galvanized sheet since it is lightweight, resistant and stainless, crossed transversely by a removable drawer of about 22 cm.×25 cm.×7 cm., whose bottom is composed of a thick metal mesh n°6 (i.e. with 6 wires per inch) of galvanized wire of about 19×23 cm.

A second pipe section with the same features as above, about 55 cm. long, which is connected to the bottom of the cabin described before and that crosses lengthwise through its center, both the filtering area and the inner cylinder of the rotor, ending its route at a distance of 20 to 30 mm. from the bottom of the rotor, serving as a vertical duct for the air descending throughout the suction machine.

A cylindrical and vertical metal rotor of about 190 mm. high and 250 mm. in diameter, connected through its bottom to a motor that makes it rotate, with eight equally-spaced vertical openings, cut on the face of the rotating cylinder. Four openings are rectangular-shaped and vertically-oriented, equally-spaced and face each other in pairs, and the other four openings are parallelogram-shaped, vertically-oriented, about five degrees-tilted at their angles, in the direction of the rotor rotation, also equally-spaced and facing each other in pairs and alternating with the rectangular ones. Besides the rotor has holes on the bottom that allow draining of liquids and particles.

A drainage surface located under the rotor, which merges into a pipe that is connected to a waste collector container.

Four equally-spaced vertical paddles, located on the outer face of the rotor cylinder, formed by the cylinder sheet itself folded outwards, at an angle of 90 degrees, which in turn constitute the openings described in the preceding paragraphs. Each paddle is parallelogram-shaped, with its angles tilted 5 degrees on the lengthwise axis. They are about 160 mm. high and present a lengthwise fold of about 130°, in the direction of the rotor rotation, and they are about 35 mm wide up to the described fold with the folded side about 19 mm. wider.

Four rectangular vertical paddles, formed by the sheet of the curved face of the rotor cylinder, folded 90° into the inside of the cylinder, equally-spaced, with suggested measures of about 160 mm. high and 50 mm. wide.

Other six rectangular horizontal paddles, placed perpendicularly and equally-spaced on the outer face of the metal ring surrounding the rotor mouth, through which the suction pipe passes, each of them of about 47 mm. long and about 12 mm. high, called anti "cross flow" paddles.

A set of filters placed under the rectangular cabin and around the suction pipe, attached to it by means of a rubber ring, and resting on the upper face of the casing, composed of a synthetic inner filter or pre-filter, with the same characteristics of kitchen purifier filters, and an outer filter of the type of annular air filter for car motors, characterized by its ring-shape and by being composed of an outer sieve ring made of expanded metal that protects and supports the paper filter media, an inner sieve of the same material, which supports and backs the filtering material, and between both sieves is the filter media composed of paper, made of a mixture of natural and synthetic fibers, impregnated with some thermally-cured thermoplastic resin and folded into many sections to get a greater filtering surface.

A cylindrical outer sheet casing containing the rotor and motor, located under the filtering system and on a stand, with a hole in the upper side that allows the entry of the suction pipe, leaving a light, a small hole of about 10 mm in the upper side of the cylindrical face, connected to a drainage pipe, and another slightly greater hole (about 20 mm in diameter) under the rotor and above the motor, also connected to the same drainage pipe.

A drainage pipe connecting the holes in the casing with the waste drum or tank.

A waste drum or tank, preferably made of plastic, serving as a collector of liquids and solids separated by effect of the changes of air direction.

A three-legged metal base with two trays, one located at about 15 cm from the ground, holding the collector drum, and a second tray, al about 65 cm from the ground, holding the rest of the device.

An electric board with a thermo-magnetic switch attached to the outer face of the casing, and connected to the mains and motor, and a pressure switch with an air pressure sensor and siren.

An electric motor connected to the underside of the rotor by a conical shaft, with the following suggested features: single phase motor, half hp power, consumption of about 1.5 amperes fed from the board, a quarter horse of strength, 220 volts and 1.1 amperes.

Operation of the Invention

The vertical suction machine and separator of chips, steam and smoke described herein, has the following operation characteristics:

When the electric board is switched on, electricity is supplied to the motor which is put into operation and makes the rotor rotate by means of the conical shaft by which it is connected.

By the rotation of the rotor, the air inside starts to move sideways, creating a negative air pressure zone which, through the air collector pipe that is connected to the machine to be cleaned up, starts to attract polluted air inside the machining centre, automatic lathe, etc.

This air flow that runs along the pipe, passes through the first cabin, crossing the wire mesh which filters chips or larger particles.

This mesh is placed on a removable drawer, in order that it can be quickly and easily removed for cleaning and put back in a matter of seconds.

The air flow then continues along the second section of the pipe, which ends up at about 20 or 30 mm from the bottom of the rotor.

There the air hits hard against the bottom and changes direction 180°, moving upwards, outside the pipe and into the rotor, where the movement of the inner paddles drives it out, through the cylinder openings and the movement of the outer paddles drives it upwards again.

Ascending air hits against the inner part of the ring in the casing mouth, and turns 90° in a new sudden change of direction. In this hit the air comes off and keeps rising through the light left between the suction pipe and the casing mouth up to the area where the remaining liquid is filtered, which by effect of centrifugal force is directed towards the upper hole in the case and from there to the drainage pipe.

Once in the filtering area and due to internal pressure, air is pushed through the first filter or pre-filter and then through the second filter, to later emerge outside.

The process of particles separation takes place in several stages: first, when crossing the metal mesh where larger solid waste is trapped.

Secondly, at the time at which the air column hits the bottom of the rotor: water spray, oil or any heavier particle cannot follow the turning of air, because of their greater specific gravity, and when hitting against the bottom they are trapped there, and then drain through the holes in the base and, by the centrifugal force itself, go towards the lower hole in the casing, the drainage pipe and the collector drum, while the air changes direction 180° and goes on upwards.

In this second part more than 99% of the air impurities are separated.

The third separation stage occurs when the air flow goes through the rotor outer paddles. The tilt of these paddles allows to reach an air flow speed greater than 40 meters per second without increasing the motor power. Their fold of 130° form a gutter which, by effect of the different weights of liquid and air, makes the liquid in the form of microdrops get trapped in the gutter, while the air turns upwards in direction to the filters. Then those microdrops, by the centrifugal process itself, are dragged up to the top of the casing and ejected through the upper drainage hole.

A fourth stage takes place with the last change of air direction, with a turn of 90° in the region of the upper drainage, when hitting against the inside of the ring in the casing mouth, and before the passing of air through filters, where the remaining separated liquid is left on the cover of the casing and is driven by centrifugal force, towards the outlet hole of the upper drainage.

The air, in turn, leaves the casing, going through its mouth, and around the suction pipe.

In this transit area the differences of air pressure are greater, and there is a risk of an internal recirculation of air (or cross-flow) which may affect the suction capacity of the device. To ensure a proper channeling of air flows, the anti cross-flow paddles, located on the upper external side of the ring in the mouth of the rotor cylinder, when rotating generate a new flow, which re-directs the air towards the filtering area, preventing its recirculation.

Once the casing mouth is passed through, the air reaches the filtering area, whose upper attachment to the suction pipe is closed by a rubber ring to avoid the air exhaust. Thus, air is forced through the pre-filter and filter by its own internal pressure, and in that passing any drop or particle that could have passed through the previous sudden changes of air direction are being retained, and the purification process ends up when the air goes outside.

As highly purified air reaches the filters, their wear is minimal and they do not need to be replaced as frequently as other suction machines. Notwithstanding that, the suction machine has an alarm system connected to a pressure switch with a sensor that detects any increase of air pressure and is triggered when there is a 15% decrease in the filtering threshold, indicating the filter needs to be replaced.

This sound sensor is justified because the filters plugging is produced from inside to outside and can not be seen from the outside of the suction machine.

DRAWINGS DESCRIPTION

Figure 2:
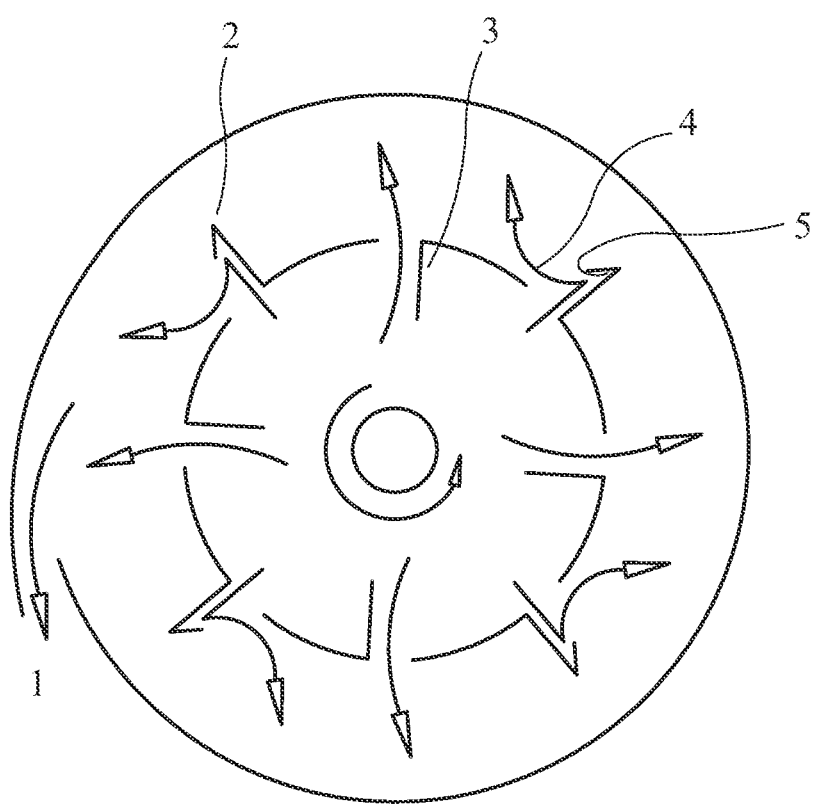
Figure 3:
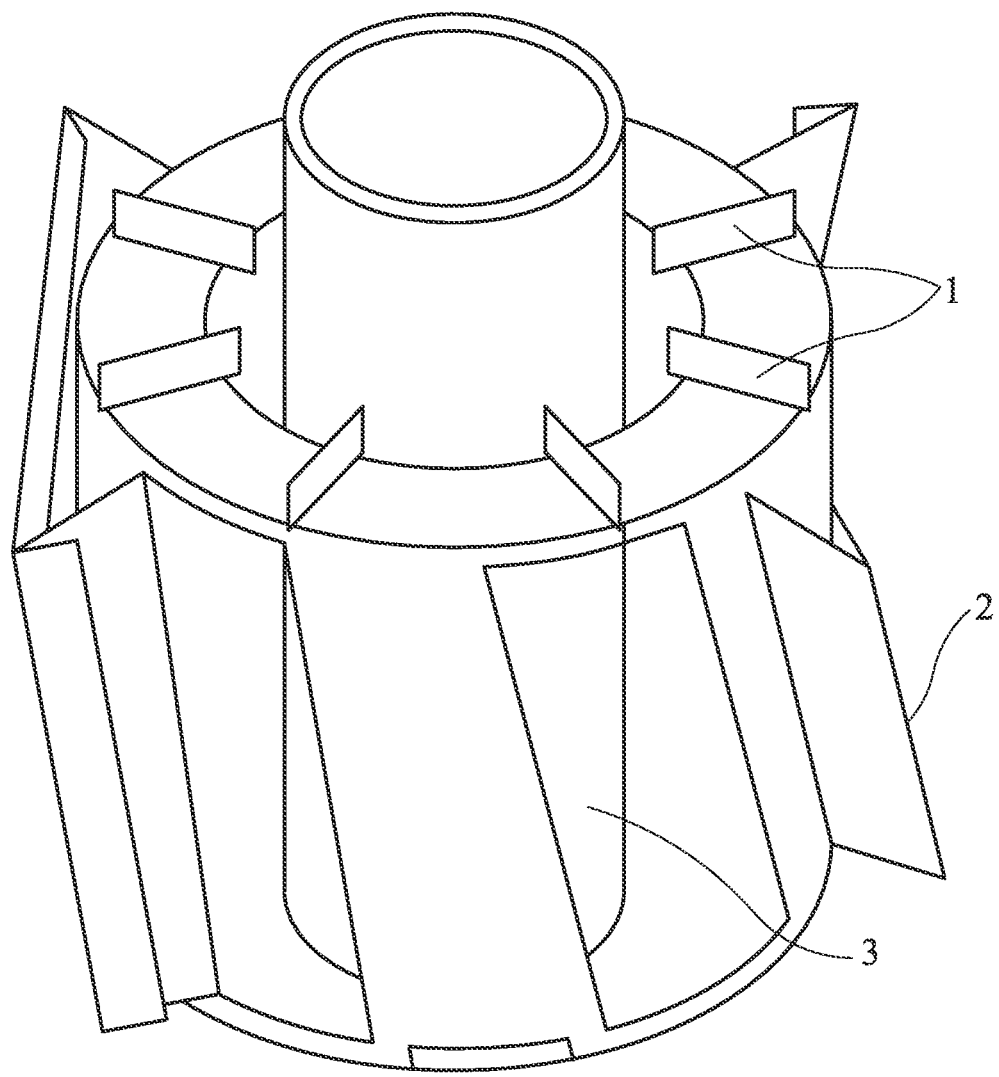
Figure 4:
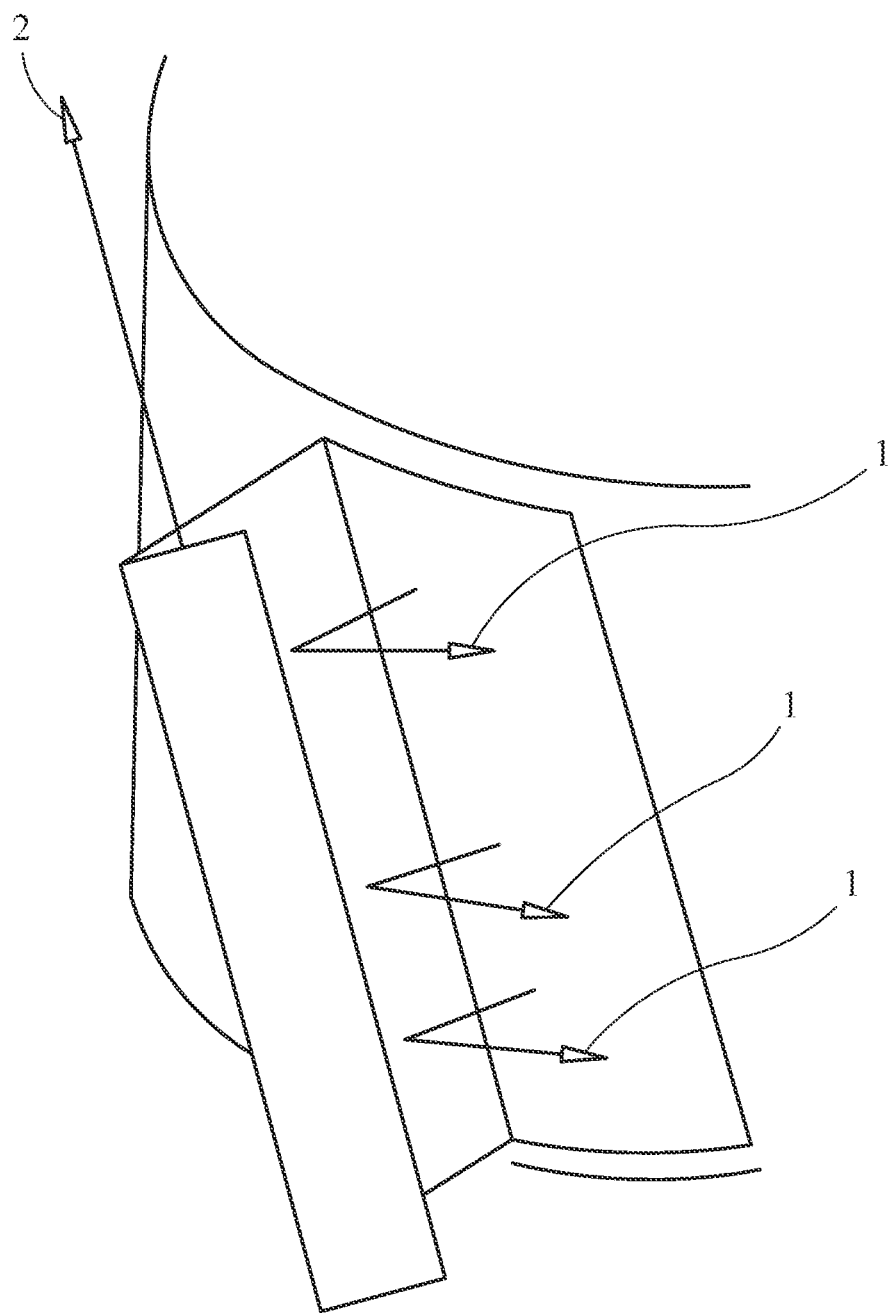

FIG. 1 shows a slitting of the separating-suction machine where the arrows show the direction of air flow, with the following references:
Ref. 1: shows the downward airflow
Ref. 2: shows the wire metal mesh
Ref. 3: shows the place of the first change of direction of air flow
Ref. 4: shows the motor
Ref. 5: shows the lower drainage hole in the casing
Ref. 6: shows the new air direction after the first hit.
Ref. 7: shows the rectangular inner paddles of the rotor
Ref. 8: shows the outer paddles of the rotor, tilted and lengthwise folded
Ref. 9: shows the section of outer paddles folded 130° and the gutter formed there
Ref. 10: shows the direction of microdrops trapped in the gutter.
Ref. 11: shows the upper drainage hole in the casing
Ref. 12: shows the hit of air flow against the upper side of the casing.
Ref. 13: shows the position of the pre-filter
Ref. 14: shows the ring shaped filters
Ref. 15: shows the exit of purified aft to the plant
Ref. 16: shows the suction pipe FIG. 2 shows a section which allows an overhead or plan view of the rotor inside, with the following references:
Ref. 1: shows the upper exit hole or canal for pollutants
Ref. 2: shows one of the outer paddles, tilted and lengthwise-folded 130°
Ref. 3: shows one of the rectangular inner paddles
Ref. 4: shows the change of air direction when hitting the outer paddles
Ref. 5: shows the gutter where polluting microdrops are accumulated FIG. 3 shows a perspective view of the rotor and suction pipe, with the following references:
Ref. 1: shows the horizontal anti "cross-flow" paddles
Ref. 2: shoes the tilted and folded outer paddles
Ref. 3: shows the suction pipe FIG. 4 shows the outer paddles detailed as follows:
Ref. 1: shows the change of direction of air flow
Ref. 2: shows the gutter for retention of liquids and heavy elements The entire contents of Argentine application P2010 0104101, filed Nov. 5, 2010, is incorporated herein by reference in its entirety.

This application claims priority to AR P2010 0104101, filed Nov. 5, 2010.

Having described and determined the nature of the invention, its scope and the way in which its fundamental idea can be put into practice, the following is stated as a proprietary invention:

1. A vertical filtering and separating apparatus for purifying pollutants in a machine which generates machine chips, oil, steam, mist or smoke, comprising:
an air inlet suction pipe having a first section connected to a machine to be purified, and a filter cabin that is transversely crossed by a mesh, for coarse filtering of air sucked through the inlet pipe,
said air inlet suction pipe having a second section which extends down from said filter cabin and enters a central part of a separating system containing a cylindrical outer casing, a cylindrical rotor and a rotor bottom, said air inlet suction pipe extending down near to the rotor bottom;
said cylindrical rotor having a curved face with vertical parallel shaped openings, inner paddles at angles tilted a few degrees from the vertical axis, outer paddles at angles tilted a few degrees from the vertical axis with longitudinal folds of about 130° forming gutters in the direction of rotation, and holes leading to a drainage surface,
the cylindrical rotor having an upper face with a central circular opening through which the air inlet suction pipe passes, said upper face also having a set of external horizontal rectangular paddles,
the cylindrical rotor being connected by a shaft to an electrical motor located under the separating system;
said cylindrical outer casing having an upper lace through which the air inlet suction pipe enters,
the cylindrical outer casing having a set of holes in its curved face located under the rotor but above the motor and leading to a drainage pipe, plus a second set of elongated holes located higher on said curved face which also lead to a drainage pipe,
the cylindrical outer casing having a set of filters placed under said upper face for fine filtration of air, composed of an inner filter and an outer filter; and
an alarm system connected to a pressure switch with a sensor that detects an increase in air pressure.

2. The apparatus of claim 1, wherein said inner air filter has synthetic filter media, and said outer air filter is annular with paper filter media.

3. The apparatus of claim 1, wherein the first and second set of holes in the cylindrical outer easing both lead to the same drainage pipe.

4. The apparatus of claim 1, wherein air flow hits the rotor bottom and changes direction 180° first, then 130° and then 90° respectively.

5. The apparatus of claim 1, wherein separation of pollutants is made by sudden changes in air flow direction causing them to hit areas in the apparatus due to having greater specific gravity than air, preventing said pollutants from turning with the air flow.

6. The apparatus of claim 1, wherein said gutters operate as a hitting, surface for the air flow and causing a change of direction, by which polluting liquid drops are retained.

7. The apparatus of claim 1, wherein said horizontal rectangular paddles help direct air towards the set of filters and help avoid internal recirculation of air flow.

8. The apparatus of claim 1, wherein said mesh is the only filter element in the air inlet suction area and is incorporated into a removable drawer for cleaning.

9. The apparatus of claim 1, wherein the filters for fine filtration of air are located only downstream of the separating system but prior to an air outlet.

10. The apparatus of claim 1, wherein the alarm system is triggered when there is a predetermined decrease in a filtering threshold, indicating that a filter needs to be replaced.

11. The apparatus of claim 1, which operates with a single phase motor of ⅓ horse power and consumes about 1.5 amperes.

* * * * *